United States Patent
Wolfsen

[11] Patent Number: 5,845,733
[45] Date of Patent: Dec. 8, 1998

[54] RETINA SCANNING ANTI-THEFT DEVICE FOR MOTOR VEHICLES

[76] Inventor: Adam Wolfsen, 7554 E. Sequoia Ave., Denver, Colo. 80231

[21] Appl. No.: 812,352

[22] Filed: Mar. 5, 1997

[51] Int. Cl.[6] ................................................. B60R 25/04
[52] U.S. Cl. .................. 180/287; 307/10.3; 340/825.31; 340/825.34; 382/117
[58] Field of Search .......................... 180/287; 307/10.3, 307/10.4, 10.5; 340/426, 576, 825.31, 825.34; 382/117

[56] References Cited

U.S. PATENT DOCUMENTS

| | | | |
|---|---|---|---|
| D. 302,153 | 7/1989 | Karecki | D14/116 |
| 5,351,781 | 10/1994 | Pritchard et al. | 180/287 |
| 5,449,957 | 9/1995 | Carlo | 180/287 |
| 5,508,693 | 4/1996 | Wake | 180/287 |
| 5,660,246 | 8/1997 | Kaman | 180/287 |
| 5,686,765 | 11/1997 | Washington | 180/287 |

*Primary Examiner*—Peter C. English

[57] ABSTRACT

A retina scanning anti-theft device for motor vehicles includes a retinal scanner electrically connected to a vehicle's ignition system for preventing a starter from turning over an engine within the vehicle unless a proper retinal pattern is detected. The inventive device further has the capabilities of detecting when a driver is under the influence of drugs or alcohol by the dilation, constriction or expansion of the retinal blood vessels and thereby preventing the operation of the vehicle under such influence.

7 Claims, 3 Drawing Sheets

RETINA SCANNING ANTI-THEFT DEVICE FOR MOTOR VEHICLES

BACKGROUND OF THE INVENTION

1. Field of the Invention

The present invention relates to Retina Scanning Devices and more particularly pertains to a new Retina Scanning Anti-Theft Device for Motor Vehicles for preventing the theft of an automobile.

2. Description of the Prior Art

The use of Retina Scanning Devices is known in the prior art. More specifically, Retina Scanning Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Retina Scanning Devices include U.S. Pat. No. 5,359,669; U.S. Pat. No. 4,975,969; U.S. Design Pat. No. 302,153; U.S. Pat. No. 5,268,963; U.S. Pat. No. 5,449,957; U.S. Pat. No. 5,351,781 and U.S. Pat. No. 4,109,237.

While these devices fulfill their respective, particular objectives and requirements, the aforementioned patents do not disclose a new Retina Scanning Anti-Theft Device for Motor Vehicles. The inventive device includes a retinal scanner electrically connected to a vehicle's ignition system for preventing a starter from turning over an engine within the vehicle unless a proper retinal pattern is detected.

In these respects, the Retina Scanning Anti-Theft Device for Motor Vehicles according to the present invention substantially departs from the conventional concepts and designs of the prior art, and in so doing provides an apparatus primarily developed for the purpose of preventing the theft of an automobile.

SUMMARY OF THE INVENTION

In view of the foregoing disadvantages inherent in the known types of Retina Scanning Devices now present in the prior art, the present invention provides a new Retina Scanning Anti-Theft Device for Motor Vehicles construction wherein the same can be utilized for preventing the theft of an automobile.

The general purpose of the present invention, which will be described subsequently in greater detail, is to provide a new Retina Scanning Anti-Theft Device for Motor Vehicles apparatus and method which has many of the advantages of the Retina Scanning Devices mentioned heretofore and many novel features that result in a new Retina Scanning Anti-Theft Device for Motor Vehicles which is not anticipated, rendered obvious, suggested, or even implied by any of the prior art Retina Scanning Devices, either alone or in any combination thereof To attain this, the present invention generally comprises a retinal scanner electrically connected to a vehicle's ignition system for preventing a starter from turning over an engine within the vehicle unless a proper retinal pattern is detected.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Retina Scanning Anti-Theft Device for Motor Vehicles apparatus and method which has many of the advantages of the Retina Scanning Devices mentioned heretofore and many novel features that result in a new Retina Scanning Anti-Theft Device for Motor Vehicles which is not anticipated, rendered obvious, suggested, or even implied by any of the prior art Retina Scanning Devices, either alone or in any combination thereof.

It is another object of the present invention to provide a new Retina Scanning Anti-Theft Device for Motor Vehicles which may be easily and efficiently manufactured and marketed.

It is a further object of the present invention to provide a new Retina Scanning Anti-Theft Device for Motor Vehicles which is of a durable and reliable construction.

An even further object of the present invention is to provide a new Retina Scanning Anti-Theft Device for Motor Vehicles which is susceptible of a low cost of manufacture with regard to both materials and labor, and which accordingly is then susceptible of low prices of sale to the consuming public, thereby making such Retina Scanning Anti-Theft Device for Motor Vehicles economically available to the buying public.

Still yet another object of the present invention is to provide a new Retina Scanning Anti-Theft Device for Motor Vehicles which provides in the apparatuses and methods of the prior art some of the advantages thereof, while simultaneously overcoming some of the disadvantages normally associated therewith.

Still another object of the present invention is to provide a new Retina Scanning Anti-Theft Device for Motor Vehicles for preventing the theft of an automobile.

Yet another object of the present invention is to provide a new Retina Scanning Anti-Theft Device for Motor Vehicles which includes a retinal scanner electrically connected to a vehicle's ignition system for preventing a starter from turning over an engine within the vehicle unless a proper retinal pattern is detected.

Still yet another object of the present invention is to provide a new Retina Scanning Anti-Theft Device for Motor Vehicles that prevents theft of the vehicle while preventing operation of the vehicle under the influence of drugs or alcohol.

Even still another object of the present invention is to provide a new Retina Scanning Anti-Theft Device for Motor Vehicles that will detect the subtle differences within the retinal blood vessels within the user's eyes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

DESCRIPTION OF THE PREFERRED EMBODIMENT

Figure 1:
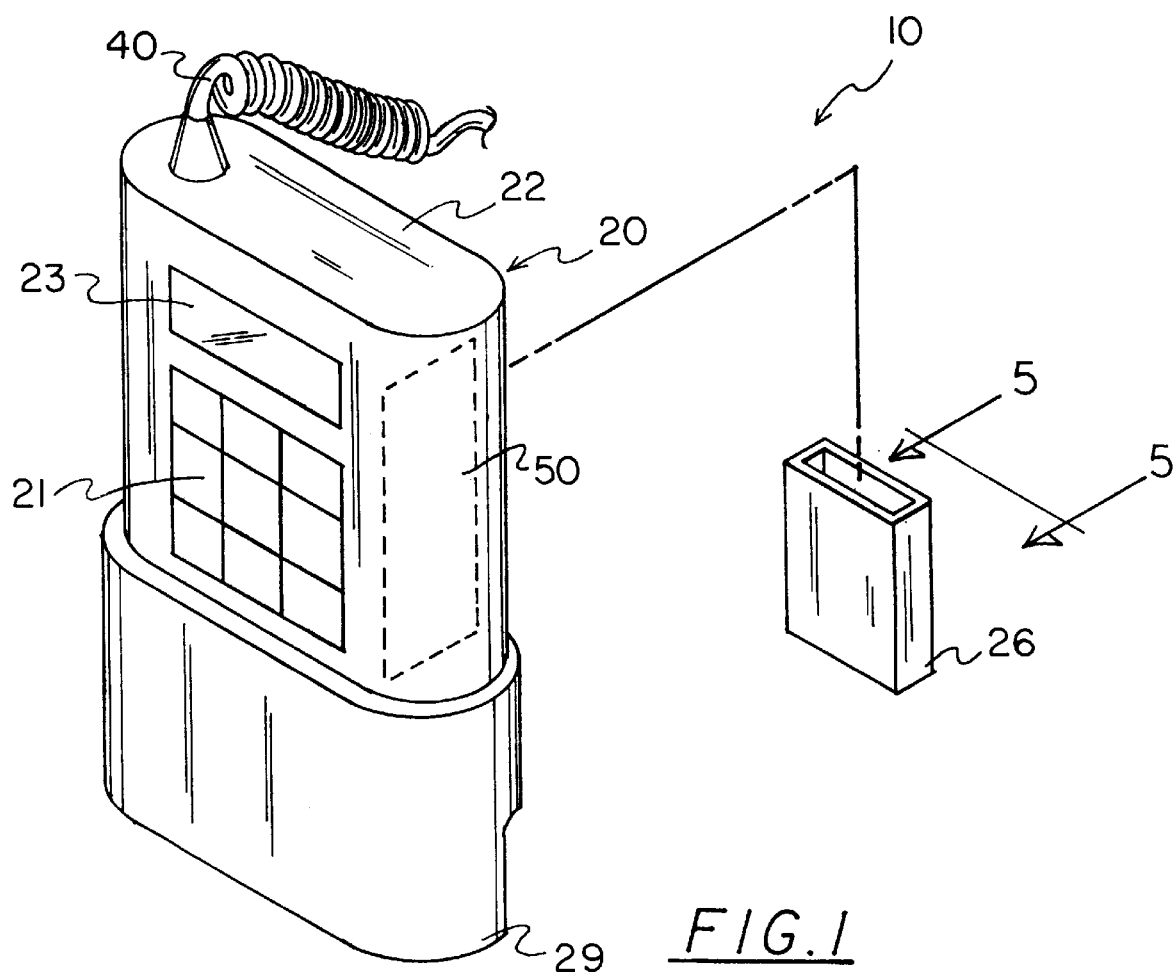
FIG. 1 is an upper perspective view of a new Retina Scanning Anti-Theft Device for Motor Vehicles according to the present invention.

With reference now to the drawings, and in particular to FIGS. 1 through 6 thereof, a new Retina Scanning Anti-Theft Device for Motor Vehicles embodying the principles and concepts of the present invention and generally designated by the reference numeral 10 will be described.

More specifically, it will be noted that the Retina Scanning Anti-Theft Device for Motor Vehicles 10 comprises a retinal scanner 20 capable of detecting and storing, a plurality of retinal patterns for a plurality of valid drivers for a vehicle. The retinal scanner 20 is electrically connected to a vehicle's ignition system for preventing starting of the vehicle unless the retinal scanner 20 detects a retinal pattern substantially similar to one of the valid drivers. The retinal scanner 20 preferably allows up to 30 seconds for an individual to start the vehicle upon detection of the retinal pattern substantially similar to one of the valid drivers.

Figure 2:
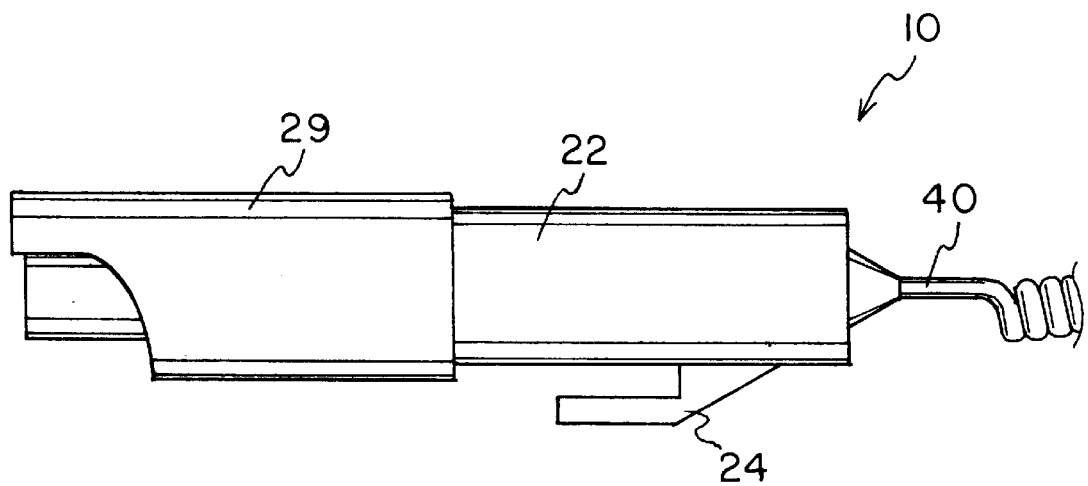
FIG. 2 is a side view of the present invention.
Figure 3:
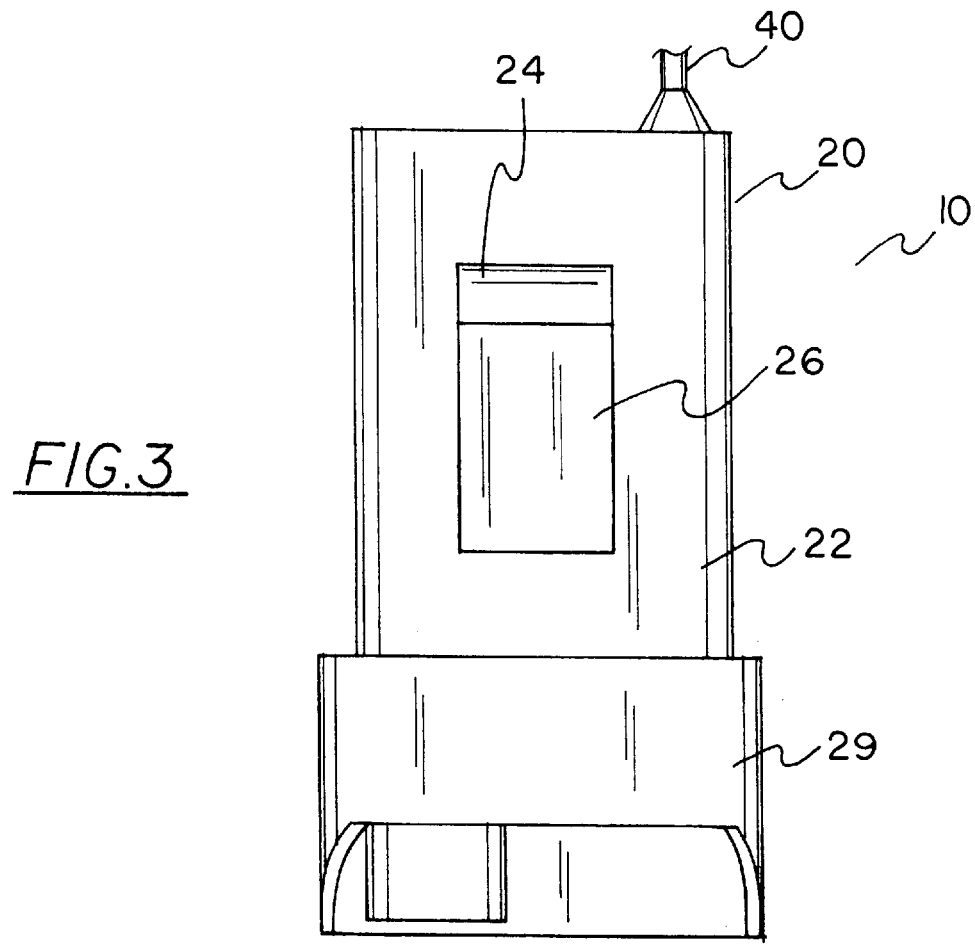
FIG. 3 is a bottom view of the present invention.
Figure 4:
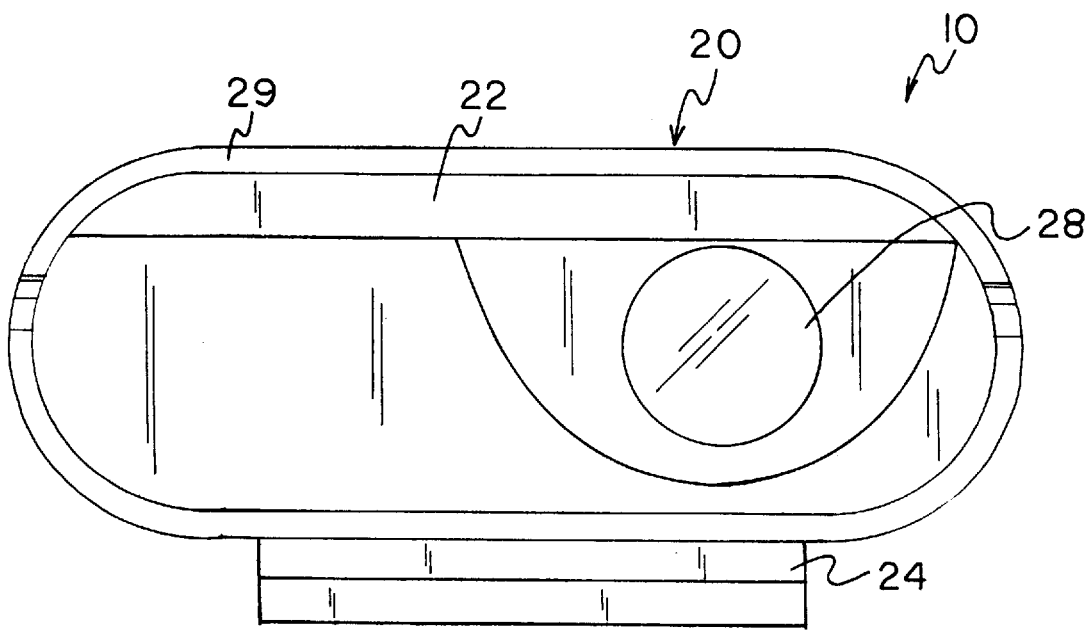
FIG. 4 is a front view of the present invention.
Figure 5:
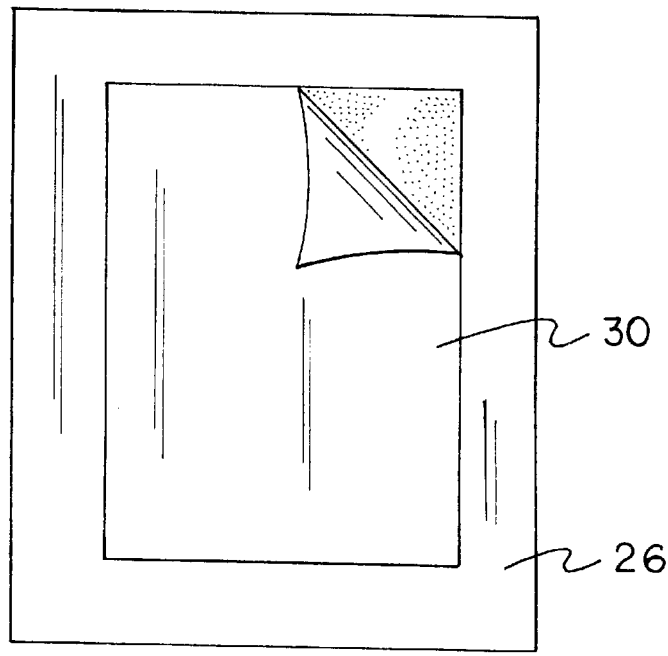
FIG. 5 is a view taken along line 5—5 of FIG. 1.
Figure 6:
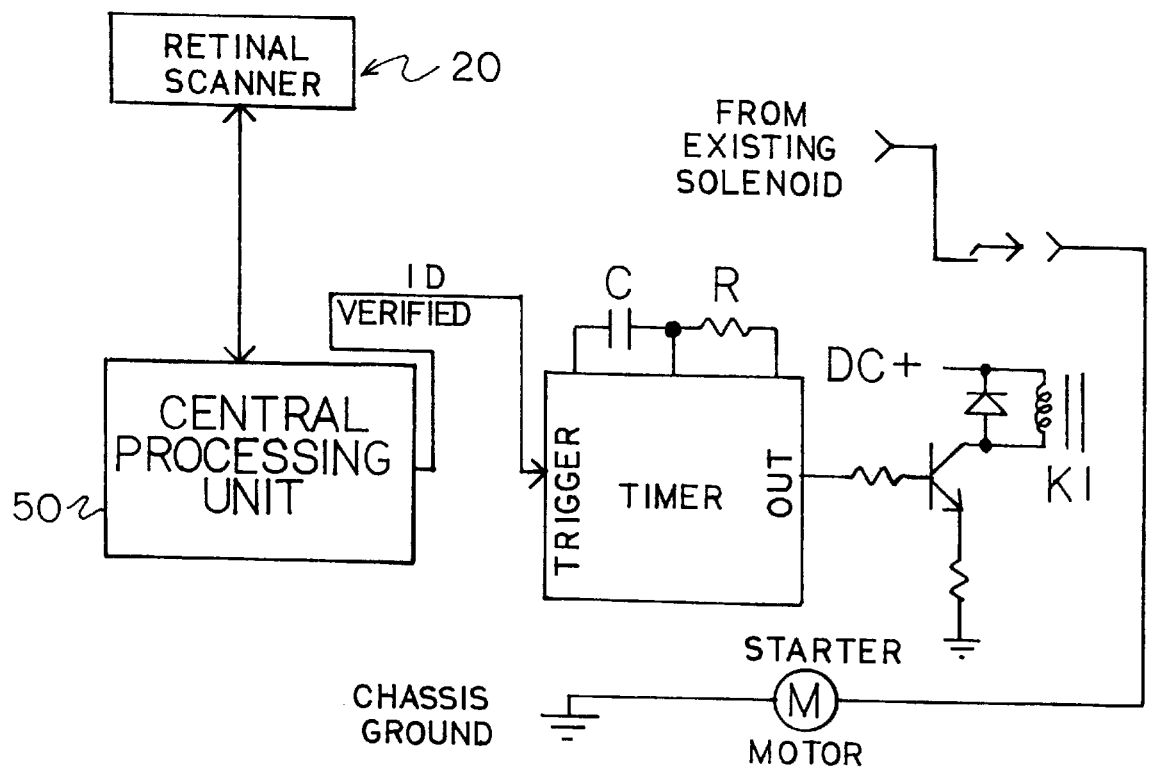
FIG. 6 is a schematic illustration of the present invention.

As shown in FIG. 6 of the drawings, the retinal scanner 20 is electrically connected to a cut-off solenoid. The retinal scanner 20 is electrically connected to the cut-off solenoid by a coiled data cable 40 as shown in FIGS. 1 through 3 of the drawings. The cut-off solenoid is electrically connected mesially a starter motor's existing solenoid and the starter motor, whereby the circuit between the existing solenoid and the starter motor is closed only when the cut-off solenoid is closed. Thus, the cut-off solenoid disables the starter motor when the cut-off solenoid is open.

As shown in FIGS. 1 through 4 of the drawings, the retinal scanner 20 includes an encasement 22 substantially rectangular shaped with arcuate edges. A keypad 21 is secured within the encasement 22 for allowing manual control of the retinal scanner 20. A display 23 is secured within the encasement 22 for disclosing relevant information to a user. A scanning lens 28 is secured within the encasement 22 for reading the retinal pattern of the user. A central processing unit 50 is positioned within the encasement 22. The central processing unit 50 is electrically connected to the keypad 21, to the display 23 and to the scanning lens 28. An EEPROM chip is electrically connected to the central processing unit 50 for storing the retinal patterns of the valid drivers. A shading member 29 is secured around a peripheral edge of the encasement 22 surrounding the scanning lens 28 for preventing contamination during scanning of the user's retinal pattern.

As shown in FIGS. 2 through 5 of the drawings, the retinal scanner 20 includes a clip 24 secured to a rear surface of the encasement 22 for removably engaging a rectangular tube 26 secured within the vehicle. A length of adhesive tape 30 is secured to the rectangular tube 26 for mounting the rectangular tube 26 within an interior portion of the vehicle.

As shown in FIG. 6, the central processing unit 50 receives data from the retinal scanner, verifies the user's identification and triggers the timer unit to enable the starter motor.

In use, an individual who desires to operate the vehicle positions the scanning lens 28 near his or her eye. The scanning lens 28 reads the retinal pattern of the individual's eye upon the user pressing a read button of the keypad 21. The central processing unit 50 determines if the read retinal pattern substantially matches any of the retinal patterns of valid drivers stored within the EEPROM chip. If a match is successful, the retinal scanner 20 electrically closes the cut-off solenoid for 30 seconds allowing the individual to start the vehicle for 30 seconds following the successful retinal pattern match. However, if the central processing unit 50 is unable to determine a match, then the cut-off solenoid remains open thereby preventing the individual from closing the circuit between the starter motor and the existing solenoid within the starter motor. The present invention is also capable of measuring subtle differences within the retinal blood vessels caused by the individual being under the influence of alcohol or drugs, thereby preventing the driver from driving while under the influence of such drugs or alcohol. The present invention may be utilized for any commercial or noncommercial vehicle where an impaired driver could cause serious injury to another individual or steal the vehicle such as an airplane, a bus, a boat and various other vehicles. The present invention may be installed within an existing vehicle or it may be connected within a newly manufactured vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retina scanning anti-theft device for motor vehicles comprising:

a retinal scanner capable of detecting and storing a plurality of retinal patterns for a plurality of valid users;

said retinal scanner being electrically connected to a vehicle's ignition system for preventing starting of said vehicle unless said retinal scanner detects a retinal pattern substantially similar to one of said valid users; and wherein said retinal scanner allows an individual to start said vehicle for a predetermined time period upon detection of said retinal pattern substantially similar to one of said valid users;

wherein said retinal scanner is electrically connected to a cut-off solenoid, wherein said cut-off solenoid is electrically connected between a starter motor of a vehicle and a solenoid of said starter motor of said vehicle for preventing electrical flow to said starter motor, whereby an electrical circuit between the solenoid of said starter motor and said starter motor is continuous only when said cut-off solenoid is closed;

wherein said retinal scanner includes:
an encasement for holding said retinal scanner;
a keypad in said encasement, said keypad being adapted for allowing, manual control of said retinal scanner;
a display in said encasement, said display being adapted for disclosing relevant information to a user;
a scanning lens in said encasement, said scanning lens being adapted for reading said retinal patterns of said users; and
a central processing unit positioned in said encasement, said central processing unit being electrically connected to said keypad, to said display and to said scanning lens.

2. A retina scanning anti-theft device for motor vehicles comprising:

a retinal scanner capable of detecting and storing a plurality of retinal patterns for a plurality of valid users;

said retinal scanner being electrically connected to a vehicle's ignition system for preventing starting of said vehicle unless said retinal scanner detects a retinal pattern substantially similar to one of said valid users; and wherein said retinal scanner allows up to 30 seconds for an individual to start said vehicle upon detection of said retinal pattern substantially similar to one of said valid users;

wherein said retinal scanner is electrically connected to a cut-off solenoid, wherein said cut-off solenoid is electrically connected between a starter motor's existing solenoid and said starter motor for preventing electrical flow to said starter motor, whereby an electrical circuit between said existing solenoid and said starter motor is closed only when said cut-off solenoid is closed;

wherein said retinal scanner includes:
a substantially rectangular encasement with arcuate edges;
a keypad secured within said encasement for allowing manual control of said retinal scanner;
a display secured within said encasement for disclosing relevant information to a user;
a scanning lens secured within said encasement for reading said retinal patterns of said users; and
a central processing unit positioned within said encasement and electrically connected to said keypad, to said display and to said scanning lens.

3. The retina scanning anti-theft device for motor vehicles of claim 2, wherein said retinal scanner includes a shading member secured around a peripheral edge surrounding said scanning lens for preventing contamination during scanning of said users' retinal patterns.

4. The retina scanning anti-theft device for motor vehicles of claim 2, wherein said retinal scanner includes a clip secured to a rear surface of said encasement for removably engaging a rectangular tube secured within said vehicle.

5. The retina scanning anti-theft device for motor vehicles of claim 4, including a length of adhesive tape secured to said rectangular tube for mounting said rectangular tube within an interior portion of said vehicle.

6. The retina scanning anti-theft device for motor vehicles of claim 5, wherein said retinal scanner is electrically connected to said cut-off solenoid by a coiled data cable.

7. A retina scanning anti-theft device for motor vehicles comprising:

a retinal scanner capable of detecting and storing a plurality of retinal patterns for a plurality of valid users;

said retinal scanner being electrically connected to a vehicle's ignition system for preventing starting of said vehicle unless said retinal scanner detects a retinal pattern substantially similar to one of said valid users; and wherein said retinal scanner allows a pre-determined period of time for an individual to start said vehicle upon detection of said retinal pattern substantially similar to one of said valid users;

wherein said retinal scanner is electrically connected to a cut-off solenoid, wherein said cut-off solenoid is electrically connected between a starter motor of the vehicle and an electrical power supply of the vehicle for preventing the flow of electrical power to said starter motor, wherein an electrical circuit between said starter motor and said power supply is continuous when said cut-off solenoid is closed;

wherein said retinal scanner includes:
a substantially rectangular encasement;
a keypad within said encasement for allowing manual control of said retinal scanner;
a display within said encasement for disclosing relevant information to a user;
a scanning lens within said encasement for reading said retinal patterns of said users; and
a central processing unit positioned in said encasement and electrically connected to said keypad, to said display and to said scanning lens;

wherein said retinal scanner includes a shading member secured around a peripheral edge surrounding said scanning lens for preventing contamination during scanning of said users' retinal patterns;

wherein said retinal scanner includes a clip secured to a rear surface of said encasement for removably engaging a rectangular tube secured within said vehicle;

wherein a length of adhesive tape is secured to said rectangular tube for mounting said rectangular tube in an interior portion of said vehicle; and wherein said retinal scanner is electrically connected to said cut-off solenoid by a coiled data cable.

* * * * *